F. B. HUCKSTEP.
PNEUMATIC TIRE.
APPLICATION FILED MAR. 26, 1912.

1,058,433.

Patented Apr. 8, 1913.

Fig.2.ᵃ

WITNESSES
Fenton S. Belt
M. E. Moore

Francis B. Huckstep
INVENTOR

By 
Attorney

UNITED STATES PATENT OFFICE.

FRANCIS B. HUCKSTEP, OF DES MOINES, IOWA, ASSIGNOR OF ONE-HALF TO WILLIAM F. KNAP, OF DES MOINES, IOWA.

PNEUMATIC TIRE.

1,058,453.  Specification of Letters Patent.  Patented Apr. 8, 1913.

Application filed March 26, 1912. Serial No. 686,381.

*To all whom it may concern:*

Be it known that I, FRANCIS B. HUCKSTEP, a citizen of the United States, residing at Des Moines, in the county of Polk and State of Iowa, have invented certain new and useful Improvements in Pneumatic Tires, of which the following is a specification.

My invention relates to improvements in pneumatic tires, and refers particularly to a pneumatic tire provided with an internal armor to prevent puncturing of the inner tube.

The object of the invention is to provide a simple and inexpensive form of chain armor for protecting the inner tube of a tire; which chain armor will effectually prevent entering of a tack or the like at any angle; which will not deprive the tire of its elastic quality; and which will automatically close the interstices of its coil and resist the entering of a sharp object.

To attain the desired object, the invention broadly stated resides in the provision of an armor for pneumatic tires embodying certain novel features of construction and combinations of parts for service, substantially as disclosed herein.

In the accompanying drawings I have illustrated a tire chain or armor constructed in accordance with and embodying the principles of my invention, in which—

Figure 1:
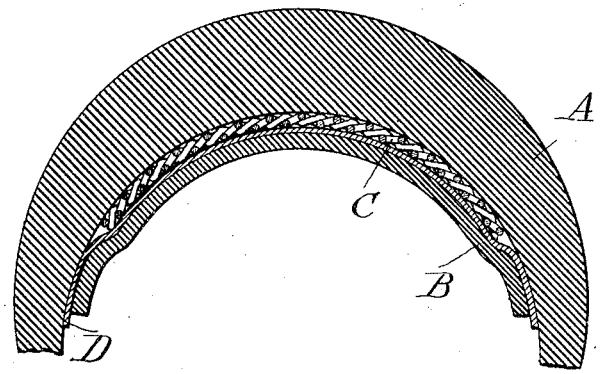
Figure 2:
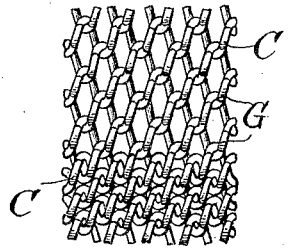
Figure 2:

Figure 1 is a cross-section of a tire with my improvements in applied position. Figs. 2 and 2ª are detail views of a portion of the tire chain detached and on an exaggerated scale, illustrating the peculiar compensating or automatic closure of the interstices of the coils, and Fig. 3 is a cross-section of a modified form of invention, in which a plurality of strips of the flexible chain is molded into the rubber of the outer tube.

In the drawings:—The letter A designates the outer tube of a pneumatic tire and B the inner tube. The armor for protecting the inner tube is composed of a plurality of links C, which are interwoven to form a very flexible construction of chain or guard, and which as best shown in Fig. 2, immediately close up when brought in contact with a sharp object to prevent entering of the object. The links are composed of flexible material and are each bent as best shown in Fig. 2ª to provide a downwardly extending portion $C'$, bent at its lower end to form an upwardly inclined portion $C^2$, bent over upon itself at its upper end to form a downwardly extending portion $C^3$ arranged in a plane substantially parallel to that of the portion $C'$, which portion $C^3$ is bent upon itself at its lower extremity to provide the upwardly extending portion $C^4$ arranged parallel to the portion $C^2$ and bent downwardly at its upper extremity to provide the portion $C^5$ arranged in a plane parallel to the portions $C'$ and $C^3$. The strips of armor are cemented or otherwise fastened to a fabric D, arranged above and cemented to the inner tube, and said fabric is preferably somewhat wider in cross-section than the cross-section of the tire. From this construction it will be seen that the armor is interposed between the outer tube of the tire and the inner tube and is retained in place by a binding of fabric or the like, and that by reason of the peculiar formation of the links of the armor, the links will automatically close up the interstices therebetween upon contact with a sharp entering point.

Figure 3:
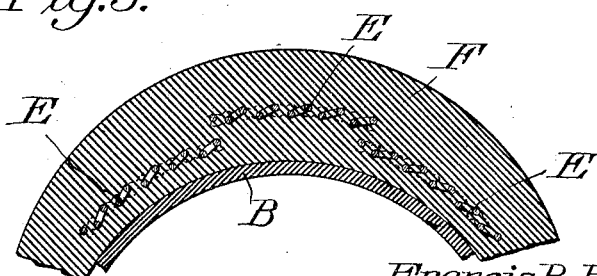
Figure 3:

In the modified construction illustrated in Fig. 3, the strips of chain E are molded into the rubber of the outer tube F and are arranged in staggered relation to prevent entering of a point at any angle. In this form, the construction of the chain links is the same as that in the preferred form.

From the foregoing description, taken in connection with the drawing, it will be apparent to all that I have provided an armor for inner tubes of tires which will prevent puncturing thereof by reason of its peculiar construction, and which will generally speaking, fill a long-felt want in the automobile and bicycle trade.

The gist of my invention and the most important feature of my improvement resides in the peculiar angular shape of the links or members forming the chain with the small interlocking bends, as by this construction, when the chain is placed in proper position and tension or strain is brought upon the tire, the links move laterally and form a compact mass which provides a perfect non-puncturable armor, and furthermore, the contacting upper and lower faces of the links are flattened, as at G which construction causes the chain to present a perfectly flat upper and lower face to the material and the complete chain forms a flat armor after the manner of a perfectly flat strip of material, and in this manner does not present any rough or protruding surfaces to the material of the tire. The manner of the lateral movement and closing of the links forming the chain is clearly shown in Fig. 2, in which a portion of the chain is shown as distended and the contiguous portion is shown as closed to form a compact flexible mass which absolutely resists being punctured.

It will be understood that my tire guard may be placed within the tire when it is molded and may be arranged in a single chain or in a series of sections having their ends overlapping. The peculiar angular or oblate shape of the coils or helices of the chains and their manner of connections with their flat faces enables the coils or helices to move in any direction to entirely close the coils or helices and form a puncture proof structure and enables the coils or helices to open or spread apart so that the guard will lie perfectly flat in the tire and not present any sharp or rough surfaces.

I claim:—

A tire armor, comprising a series of interlaced oblate helices the interengaging faces of the convolutions being flattened.

In testimony whereof I affix my signature in presence of two witnesses.

FRANCIS B. HUCKSTEP.

Witnesses:
E. F. MORSE,
JAMES W. BRYANT, Jr.